United States Patent

Sami et al.

[11] 3,991,566
[45] Nov. 16, 1976

[54] MANIFOLD REACTOR WITH AUXILIARY CHAMBER FOR SECONDARY AFTERBURNING DURING START-UP

[75] Inventors: Hiroshi Sami; Kaoru Taira; Teruo Kumai, all of Toyota, Japan

[73] Assignee: Toyota Jidosha Kobyo Kabushiki Kaisha, Toyota, Japan

[22] Filed: July 7, 1975

[21] Appl. No.: 593,331

[30] Foreign Application Priority Data
Feb. 27, 1975  Japan.............................. 50-24194

[52] U.S. Cl. ................................. 60/289; 60/282; 60/320; 60/323; 123/122 D; 123/122 H; 123/122 AB
[51] Int. Cl.² ...................... F01N 3/10; F01N 7/10; F02M 31/08
[58] Field of Search ............. 60/282, 288, 320, 323, 60/289; 123/122 AB, 122 D, 122 H, 122 AC

[56] References Cited
UNITED STATES PATENTS

| | | |
|---|---|---|
| 3,171,393 | 3/1965 | Platner et al. ................. 123/122 AB |
| 3,809,019 | 5/1974 | Stoltman ............................. 60/901 |
| 3,824,788 | 7/1974 | Cole et al. ........................... 60/284 |
| 3,898,804 | 8/1975 | Morita ................................. 60/282 |

*Primary Examiner*—Carlton R. Croyle
*Assistant Examiner*—Thomas I. Ross
*Attorney, Agent, or Firm*—Pollock, VandeSande & Priddy

[57] ABSTRACT

A thermal reactor for an internal combustion engine wherein when the temperature of the engine is low, exhaust gas exhausted from the engine is reacted in an inner core before it is mixed with secondary air and then guided to a riser member where it is heat-exchanged with intake gas mixture and thereafter exhausted through a bypass passage, and when the temperature of the engine is moderate to high the exhaust gas is mixed in the inner core with the secondary air introduced into the inner core through the vicinity of the riser member, whereby unburnt component in the exhaust gas is burnt and exhausted.

8 Claims, 4 Drawing Figures

MANIFOLD REACTOR WITH AUXILIARY CHAMBER FOR SECONDARY AFTERBURNING DURING START-UP

BACKGROUND OF THE INVENTION

The present invention relates to a thermal reactor for recombustion of exhaust gas from an internal combustion engine, and more particularly to such a thermal reactor in which heat exchange between the exhaust gas and intake gas mixture takes place through a riser member.

In one prior art system used to reduce the amount of unburnt component of HC and CO in exhaust gas, secondary gas is introduced into the exhaust gas through an air injection manifold provided in the vicinity of and downstream of an exhaust valve and the HC and CO are burnt by the secondary air in a downstream thermal reactor.

However, the above prior art system exhibits certain disadvantages in that (1) when the temperature of the engine is low, the HC and CO are not burnt because the exhaust gas in the reactor is excessively cooled; (2) the combustion of the HC and CO does not occur sufficiently because the secondary air and the exhaust gas are not uniformly mixed; and (3) due to the pulsation of exhaust pressure of the exhaust gas, a high pressure is applied to the air injection manifold which tends to block the secondary air jet.

Further, in the above prior art system, an exhaust pipe and an intake pipe are arranged adjacent to each other through a riser member so that heat exchange occurs between the exhaust gas in the exhaust pipe and the intake gas mixture. In such a case, however, when the exhaust gas is at a high temperature the intake gas mixture is excessively heated through the riser member so that the a decrease in the engine output power, and knocking during high speed driving, sometimes occur. An additional disadvantage is that control means for the above prior art heat exchange arrangement is expensive.

Moreover, in the prior art system wherein the intake gas mixture is heated by the exhaust gas which is reburnt in the thermal reactor, there are still further disadvantages in that the intake gas mixture may not be heated when the temperature of the engine is low because the gas in the thermal reactor is cooled by the secondary air, and when there is active combustion of the HC and CO in the thermal reactor the intake gas mixture is excessively heated and the carburetor is also heated by thermal conduction resulting in vapor locking.

SUMMARY OF THE INVENTION

The present invention is intended to overcome the above disadvantages encountered in the prior art system, and comprises an inner core forming a reaction chamber into which exhaust gas is introduced to burn therein unburnt component in the exhaust gas, a heat control valve arranged between the downstream side of the inner core and an exhaust pipe to control the flow rate of the gas from the exhaust pipe depending on the temperature thereof, a bypass passage interconnecting the upstream side of the inner core to the downstream end of the heat control valve to bypass the heat control valve, and a riser member arranged adjacent the upstream end of the bypass passage to transfer the heat of the exhaust gas to the gas mixture. In the region between the riser member and the bypass passage there are provided an air injection nozzle for providing an inlet jet of air, and a communicating pipe for introducing the air from the air injection nozzle into the inner core and for directing the gas in the inner core toward the riser member. When the engine and the thermal reactor are at a comparatively low temperature, there is an outflow of the exhaust gas from the inner core through the communicating pipe to the bypass passage, and the riser member is heated by the flow of the exhaust gas before it is exhausted so that heating of the intake gas mixture and the maintenance of required combustion temperature are assured. On the other hand, when the thermal reactor is at a comparatively high temperature, air from the air injection nozzle is introduced into the inner core through the communicating pipe, and the unburnt component in the exhaust gas is burnt within the inner core by the introduced air and the exhaust gas is directly exhausted from past the heat control valve and through an exhaust pipe without passing through the bypass passage. As a result of this latter mode of operation, the transfer of the combustion heat to the riser member is relieved, overheating of the intake gas mixture is prevented, and the backflow of the exhaust gas to the air injection nozzle is avoided even when the pulsation pressure of the exhaust gas acts on the air injection nozzle.

Furthermore, in the present invention, a baffle plate is provided in the thermal reactor for spreading the air from the communicating pipe into the inner core, to achieve uniform mixing of the exhaust gas and the air.

Further, in the present invention, a plurality of exhaust gas introducing pipes for introducing the exhaust gas into the inner core are provided in the thermal reactor so that the flows of the exhaust gases from the pipes form an eddy current, thereby to achieve uniform mixing of the exhaust gas and the air.

It is, therefore, a principal object of the present invention to provide a thermal reactor constructed as described above, which prevents the overheat of the riser member as well as the backflow of the exhaust gas to the air injection nozzle.

It is another object of the present invention to provide a thermal reactor having a baffle plate provided therein in the vicinity of an opening of a connecting pipe so that the air introduced from the connecting pipe into an inner core is spread by the baffle plate to attain uniform mixing of the exhaust gas and the air.

It is a still further object of the present invention to provide a thermal reactor having a plurality of exhaust gas introducing pipes so arranged therein that the flow of the exhaust gas forms an eddy current to attain uniform mixing of the exhaust gas and the air.

DESCRIPTION OF THE PREFERRED EMBODIMENT

Figure 1:
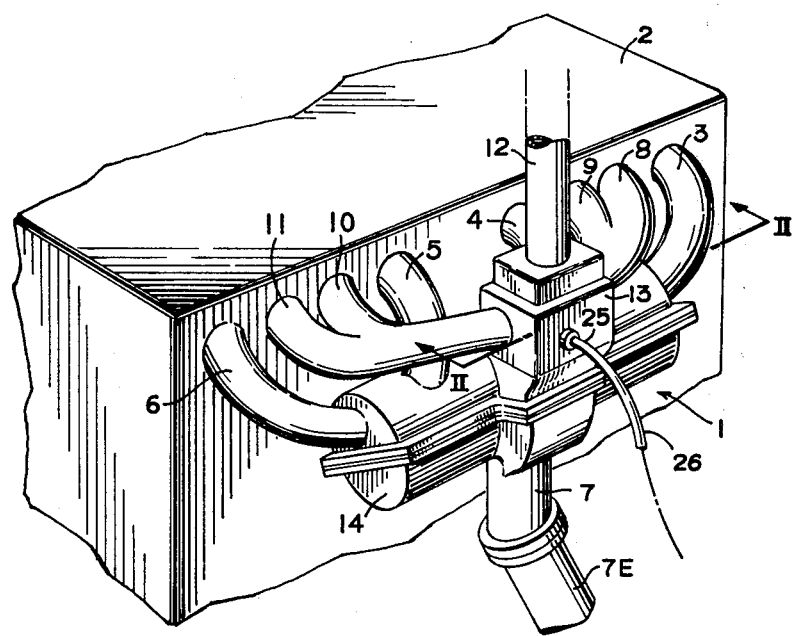
FIG. 1 is a perspective view showing an embodiment of a thermal reactor constructed in accordance with the present invention and applied to an engine.
Figure 2:
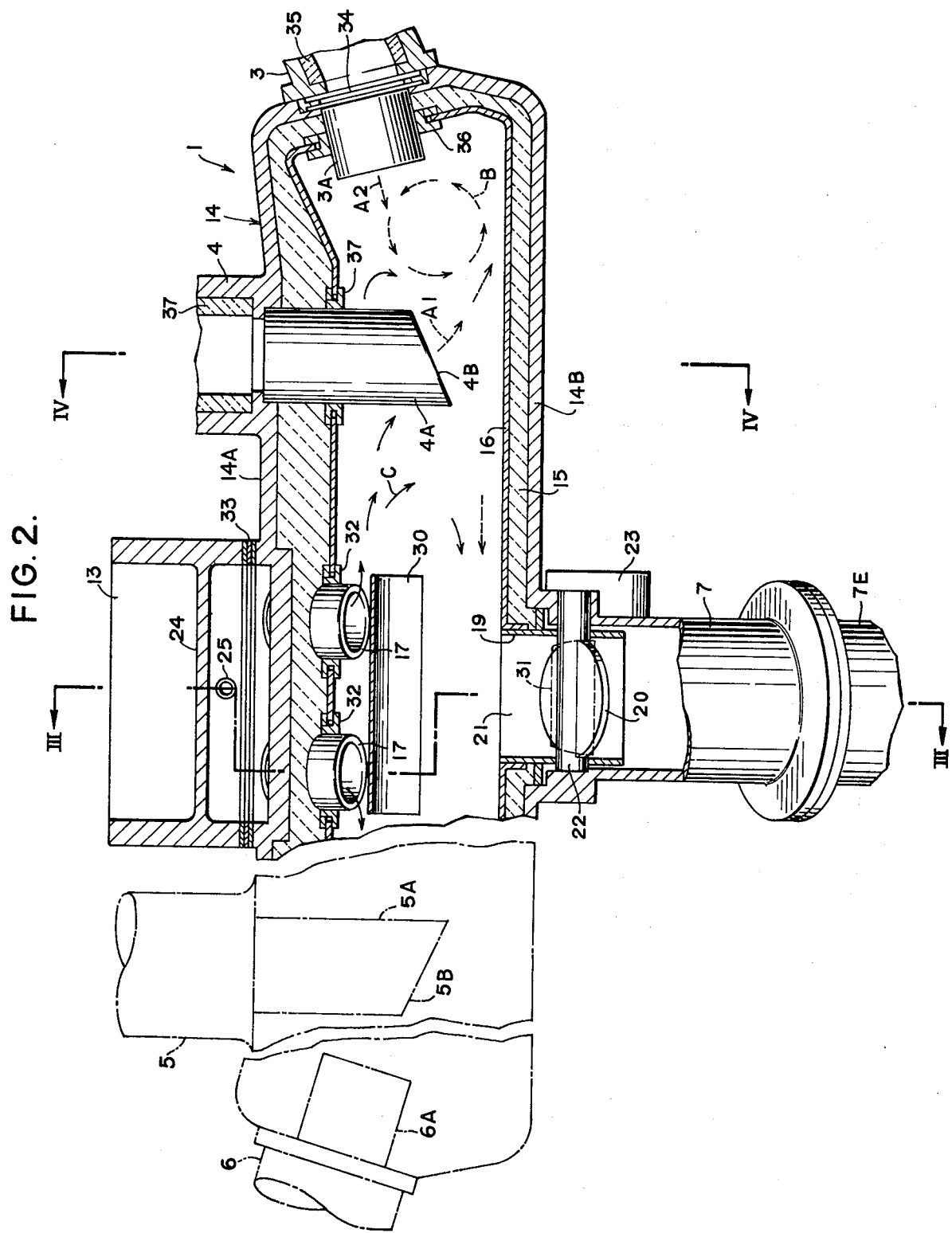
FIG. 2 is a sectional view taken along the line II—II in FIG. 1.
Figure 3:
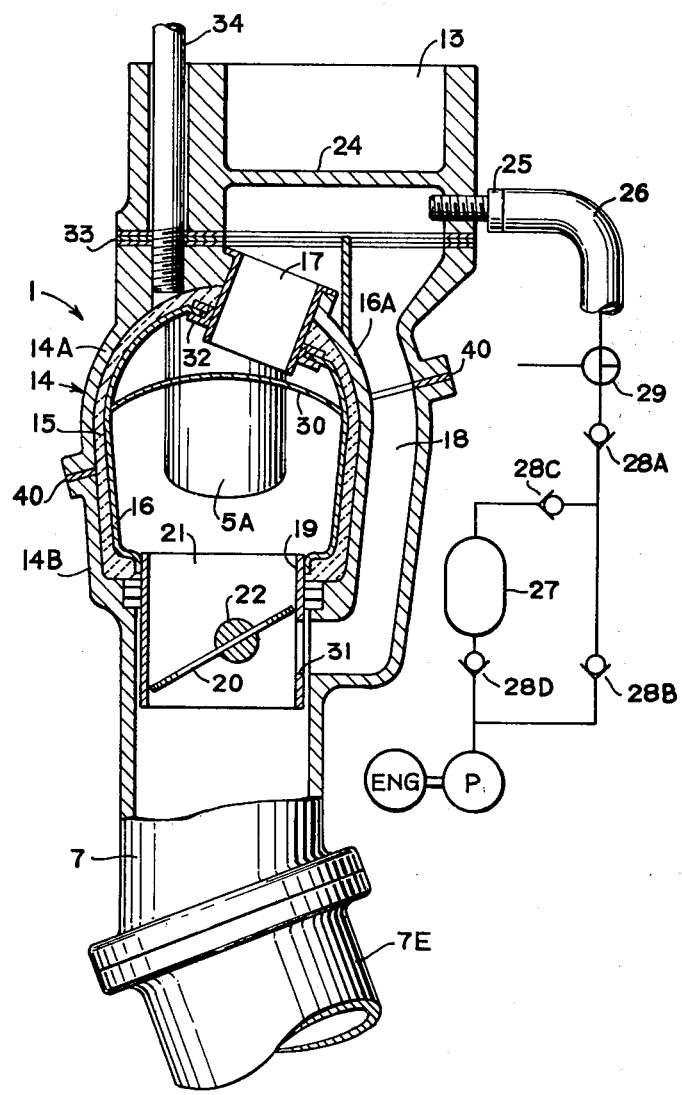
FIG. 3 is a sectional view taken along the line III—III in FIG. 2.
Figure 4:
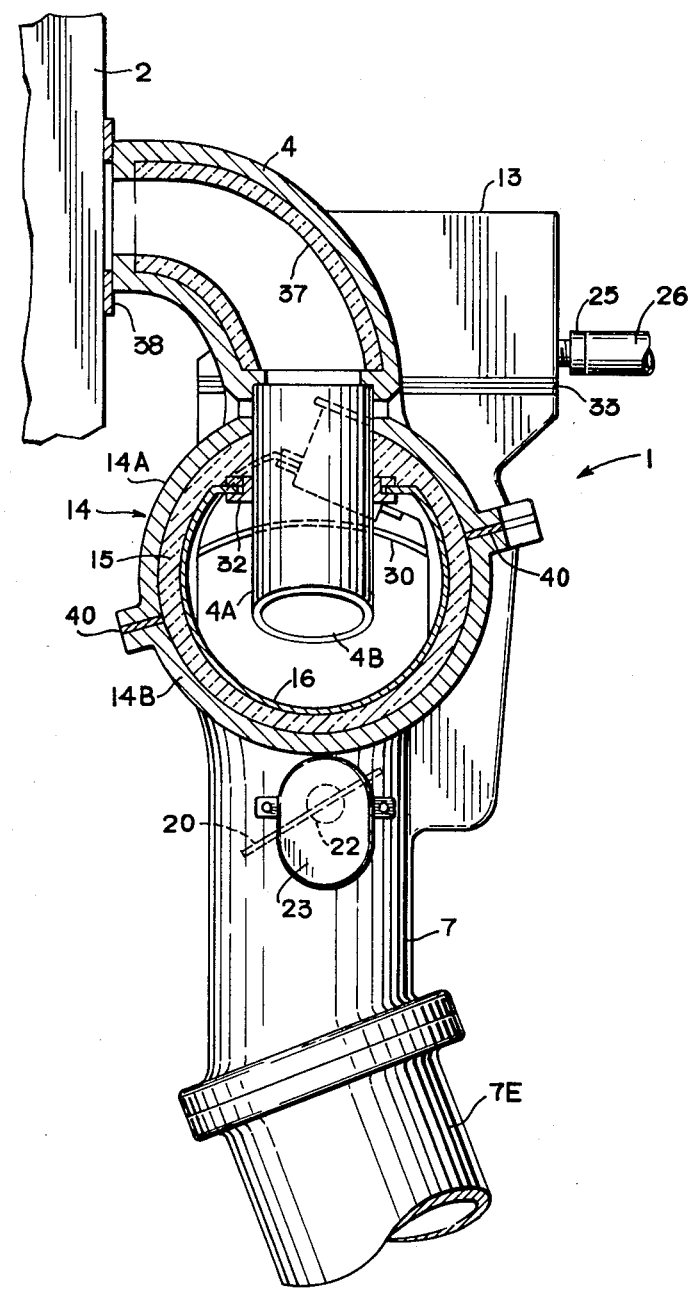
FIG. 4 is a sectional view taken along the line IV—IV in FIG. 2.

Referring to FIG. 1, a thermal reactor 1 in accordance with the present invention is positioned on a side of an engine block 2 between exhaust manifolds 3 to 6 and an exhaust pipe 7E. The thermal reactor 1 is provided with a generally hollow, cylindrical, elongated reactor case 14 which comprises a pair of generally semi-cylindrical halves, that is, an upper part 14A and a lower part 14B, which are coupled to one another by any appropriate conventional means through a sealing gasket 40 as shown in FIGS. 3 and 4. The lower side of the reactor case 14 is connected through a connecting portion 7, formed centrally at the bottom of the lower part 14B, with the downwardly extending exhaust pipe 7E, and it is also connected at a central top of the upper part 14A with intake manifolds 8 to 11 and with an intake pipe 12 by an appropriate means through a gasket 33.

Disposed within the reactor case 14 of the thermal reactor 1 is an inner core 16 which forms a reaction chamber having its peripheral layer surrounded by a thermal insulation layer 15. At the top of the inner core 16 a pair of communicating members 17 such as short pipes are secured longitudinally in parallel by means of slidable collar 32 across the inner core 16 and the heat insulating material wall 15. As shown in FIG. 3, the axial lines of the communicating pipes 17 lie in a sectional plane which is perpendicular to the longitudinal direction of the inner core 16, at an inclination angle of approximately 30° with respect to a vertical axis. A bulkhead 16A is provided on one side at the center of the case 14 and on the outerside of the heat insulating layer 15 surrounding the inner core 16, and a bypass passage 18 is formed between the bulkhead 16A and the opposite sidewall of the case 14. The upstream end of bypass passage 18 communicates with the interior of the inner core 16 through the pair of pipes 17. The inner core 16 is a horizontally elongated hollow cylinder, and the heat insulating layer 15 and the case 14 are inserted into the opposite ends of the cylinder, and exhaust gas introducing pipes 3A and 6A are fixed together with the gasket 34 by means of slidable collar 36.

Secured on an upper side of the inner core 16 between a center portion thereof and its opposite ends, respectively, by means of slidable collar 37 are exhaust gas introducing pipes 4A and 5A which communicate with the exhaust manifold pipes 4 and 5 which are formed on the outer side of the corresponding portion and which have the heat insulating layer 15 inserted therein. Secured on an outer wall of the case 14 at said opposite ends to communicate with the pipes 3A and 6A are exhaust manifold pipes 3 and 6, respectively, each having a heat insulating inner liner 35. At the positions on upper outer wall of the case 14 corresponding to the pipes 4A and 5A, are integrally formed additional exhaust manifold pipes 4 and 5 each having a heat insulating inner liner 37, and the outer ends of the pipes 4 and 5 are secured to the corresponding portions in the engine block 2 through a gasket 38 (FIG. 4).

At the center of the bottom of the inner core 16 there is provided an ejection port 19, to which is secured a short exit pipe 21 provided with a heat control valve 20 and having its lower portion located within the connecting portion 7. The exit pipe 21 is formed with an opening 31 in one side thereof which communicates with the downstream end of the bypass passage 18. The heat control valve 20 is a plate-shaped throttle valve which is supported by a valve shaft 22 having its inner end supported by the exit pipe 21 and its outer end supported by the connecting portion 7. Coupled to the outer end of the valve shaft 22 is a bimetal device 23 by which the valve 20 is so operated as to exhibit an increasing opening as the temperature at and near the connecting portion 7 rises.

Above the communicating pipes 17 a riser member 24 is formed to serve as a bulkhead between the bypass passage 18 and a connecting portion 13. Therefore the heat within the thermal reactor 1 is transferred through the riser member 24 to gas mixture in the adjacent connecting portion 13. Immediately below the riser member 24 there is fixed an air injection nozzle 25 which is connected to an air pump P through a pipe 26, a three-way valve 29, check valves 28A and 28B, and nozzle 25 is also connected to said pump P through the pipe 26, the three-way valve 29, the check valves 28A and 28C, an accumulator 27 and a check valve 28D. The pump P is driven by the engine. Thus compressed air is supplied to the air injection nozzle 25 from the air pump P and/or from the accumulator 27 which accumulates compressed air from the air pump P. This secondary air is jetted toward the communicating pipes 17 along the underside of the riser member 24. In front of the lower end openings of the communicating pipes 17 in a sectional plane which is transverse to the longitudinal length of the inner core 16, is located an arcuate baffle plate 30 which is convex upwardly and disposed transversely to and in fixed relation with an opposing inner wall of the inner core 16. The baffle plate 30 extends across the entire inner width of the inner core 16 at a level approximately two thirds of an inner diameter of the inner core 16. The longitudinal length of the baffle plate 30 is slightly longer than the longitudinal distance between respective peripheral edges of the pipes 17. With this arrangement of the baffle plate 30, the air ejected from the pipes 17 is diverted to the opposite ends of the reactor case 14 by the baffle plate 30.

The exhaust gas introducing pipes 3A and 6A are so arranged that their axial lines are directed toward the bottom center of the inner core 16 from the opposite end planes of the inner core 16 while inclining downwardly by approximately 20° with respect to the central axial line of the inner core 16. The exhaust gas introducing pipes 4A and 5A are secured to an upper wall of the inner core 16 to extend downwardly vertically from the top of the inner core 16, at positions displaced approximately one fifth lengthwise from the opposite ends of the inner core 16. The end planes defining end openings 4B and 5B of the exhaust gas introducing pipes 4A and 5A incline toward the bottom center of the case 14 and said end planes are so located as to substantially include the center axial lines of adjacent exhaust gas introducing pipes 3A and 6A. The center axial line of the pipe 4A is traverse to the axial line of the pipe 3A while the center axial line of the pipe 5A is traverse to the axial line of the pipe 6A.

The bypass passage 18 passes behind the inner core 16 from the underside of the riser member 24 at the center of the reactor case 14 (FIG. 3) and its lower end is connected to the opening 31 formed in the exit pipe 21. The opening 31 is arranged near the downstream end of the heat control valve 20, and when the heat control valve 20 is closed the gas within the inner core 16 passes through the connecting pipes 17 to the upstream end of the bypass passage 18 and flows through passage 18 and out of the opening 31 to the exhaust pipe 7E.

In operation, when the engine is operated, the exhaust gas is introduced from the exhaust manifolds 3 to 6 into the inner core 16 of the thermal reactor 1 through the corresponding exhaust gas introducing pipes 3A to 6A. At the same time, the compressed air from the air pump P driven by the engine or from the accumulator 27 is jetted from the air injection nozzle 25 to the underside of the riser member 24.

Immediately after the start of the engine or when the engine room has not been warmed, the heat control valve 20 which is controlled by the bimetal device 23 is in its closed state or very slightly opened. Therefore, the exhaust gas introduced into the inner core 16 passes out of core 16 through the communicating pipes 17, flows through the bypass passage 18 and the opening 31 to the downstream end of the heat control valve 20, and is then guided to the exhaust pipe 7E. In the inner core 16, the HC and CO in the exhaust gas are burnt by the remaining oxygen in the exhaust gas if the temperature in said inner core is sufficiently high. In the closed state of the heat control valve 20, the secondary air supplied from the nozzle 25 does not enter the inner core 16 but it is ejected from the bypass passage 18 to the exhaust pipe 7E through the opening 31, and this tends to assure that a temperature sufficiently high to achieve combustion can be maintained in the inner core 16. In this mode of operation, the exhaust gas or recombustion gas is jetted from the inner core 16 through the communicating pipes 17 and strikes the riser member 24 to heat the same so as to warm the intake gas mixture passing through the connecting portion 13.

When the engine block 2 has been warmed and the thermal reactor 1 has been warmed, the bimetal device 23 is heated by the engine block 2 so that the aperture of the heat control valve 20 is increased in size. As a result, the exhaust gas in the inner core 16 flows from the ejecting port 19 to the exhaust pipe 7E through a path between the heat control valve 20 and the inner wall of the exhaust pipe connecting portion 7. As described above, since the exhaust gas introducing pipes 4A and 5A have the end planes of their lower openings arranged to substantially include the axial lines of the other exhaust gas introducing pipes 3A and 6A, and since said end planes are inclined outwardly, the gas flow A1 ejected from the exhaust gas introducing pipes 4A and 5A merges with the underside portion of the gas flow A2 ejected from the exhaust gas introducing pipes 3A and 6A whereby an eddy current B of the exhaust gas is created between the pipes 3A and 4A.

The air jetted from the air injection nozzle 25, in this second mode of operation, flows through the communicating pipes 17 into the inner core 16, collides against the baffle plate 30 and is scattered thereby, so that it flows toward the exhaust gas introducing pipes 4A and 5A along the baffle plate 30 as shown by an arrow C. This air is partly merged with the eddy current B and partly collides against the pipe and then uniformly mixed with the exhaust gas to cause the combustion of unburnt component of the HC and CO in the exhaust gas. The combustion gas then flows to the exhaust pipe 7E since the heat control valve 20 is in its open state.

While the combustion heat of the unburnt components such as HC and CO in the inner core 16 is also transferred to the riser member 24 by radiation and thermal conduction in this second mode of operation, the thermal transfer is reduced because a layer of air flow from the air injection nozzle 25 is formed between the riser member 24 and the inner core 16. Consequently, overheating of the riser member 24, that is, overheating of gas mixture flow passing through the connecting portion 13 is prevented, whereby the decrease in the engine output power, knocking at high speed drive and vapor locking of a carburetor can be prevented.

Although pulsation of ejecting pressure in the exhaust gas occurs during the operation of the engine so that a high pressure wave acts on the air in the air injection nozzle 25, the exhaust gas does not backflow to the air injection nozzle 25 during normal operation of the engine because the exhaust gas is exhausted from the reactor chamber directly to the exhaust pipe 7E and the nozzle 25 is not disposed directly in the exhaust gas flow.

What is claimed is:

1. A thermal reactor for an internal combustion engine comprising a reactor case; an inner core within said reactor case forming a reaction chamber, said inner core being supported by said case through a thermal resistant layer and being connected with an exhaust manifold of an engine; exhaust gas inlet pipes supported by said reactor case for introducing exhaust gas into said inner core; an outlet exhaust pipe, a connection portion on the under side of the inner core for connecting the interior of said inner core to said outlet exhaust pipe; a heat control valve disposed in said connection portion; wall means defining a bypass passage between said reactor case and said inner core, the upstream end of said bypass passage communicating with the interior of said inner core and the downstream end of said bypass passage communicating with said connection portion at a position downstream of the heat control valve to communicate the interior of the inner core directly with the outlet exhaust pipe when said heat control valve is substantially closed; a connecting part on said reactor case for connecting an intake pipe to an intake manifold of the engine; a riser member provided adjacent said connecting part, said riser member comprising a portion of the wall means defining the upstream end of the bypass passage; an air injection nozzle provided adjacent the riser member to supply secondary air into the bypass passage along the riser member; and at least one communicating pipe provided within said reactor case between the upstream end of said bypass passage and the interior of said inner core for introducing the secondary air from the air injection nozzle into the inner core when said heat control valve is opened and for guiding gas outflow from the inner core toward the riser member and thence through said bypass passage directly to said outlet exhaust pipe when said heat control valve is substantially closed.

2. A thermal reactor for an internal combustion engine according to claim 1, including a baffle plate supported within said inner core to spread the air introduced into the inner core from the air injection nozzle through said communicating pipe.

3. A thermal reactor for an internal combustion engine according to claim 1, wherein said exhaust gas inlet pipes comprise at least one pair of pipes having their respective outlets so arranged that they cooperate with one another to generate a swirl flow of incoming gas within the inner core.

4. A thermal reactor for an internal combustion engine according to claim 1, wherein said exhaust gas inlet pipes comprise at least one pair of pipes so arranged that one pipe of the said pair is supported in the reactor case between said connecting part and one end portion of said reactor case and the other pipe of the said pair is supported in said one end portion of said reactor case, said one pipe having an interior opening located within said inner core and directed obliquely toward the interior opening within said core of the other pipe, thereby to cause generation of swirl flows of the exhaust gases from the said pair of pipes between their respective interior openings within said inner core.

5. The thermal reactor of claim 1 wherein said heat control valve comprises a plate-shaped valve element mounted for pivotal movement within said connection portion, and control means responsive to the temperature adjacent said valve element for pivoting said valve element to vary the opening between said element and said connection portion.

6. The thermal reactor of claim 5 wherein said control means is operative to increase the size of said opening in response to increases in the temperature of said connection portion.

7. The thermal reactor of claim 6 wherein said control means comprises a bimetal device.

8. The thermal reactor of claim 1 wherein said reactor case is of elongated generally cylindrical configuration, said connection portion for said outlet exhaust pipe being located in a side wall of said cylindrical case substantially mid-way between the opposing ends of said case, and said connecting part for said intake pipe being located substantially diametrically opposite said connection portion in a further side wall of said case.

* * * * *